Dec. 21, 1965   R. R. BREIHAN   3,224,187
HOT GAS ENGINE
Filed May 4, 1964   2 Sheets-Sheet 1
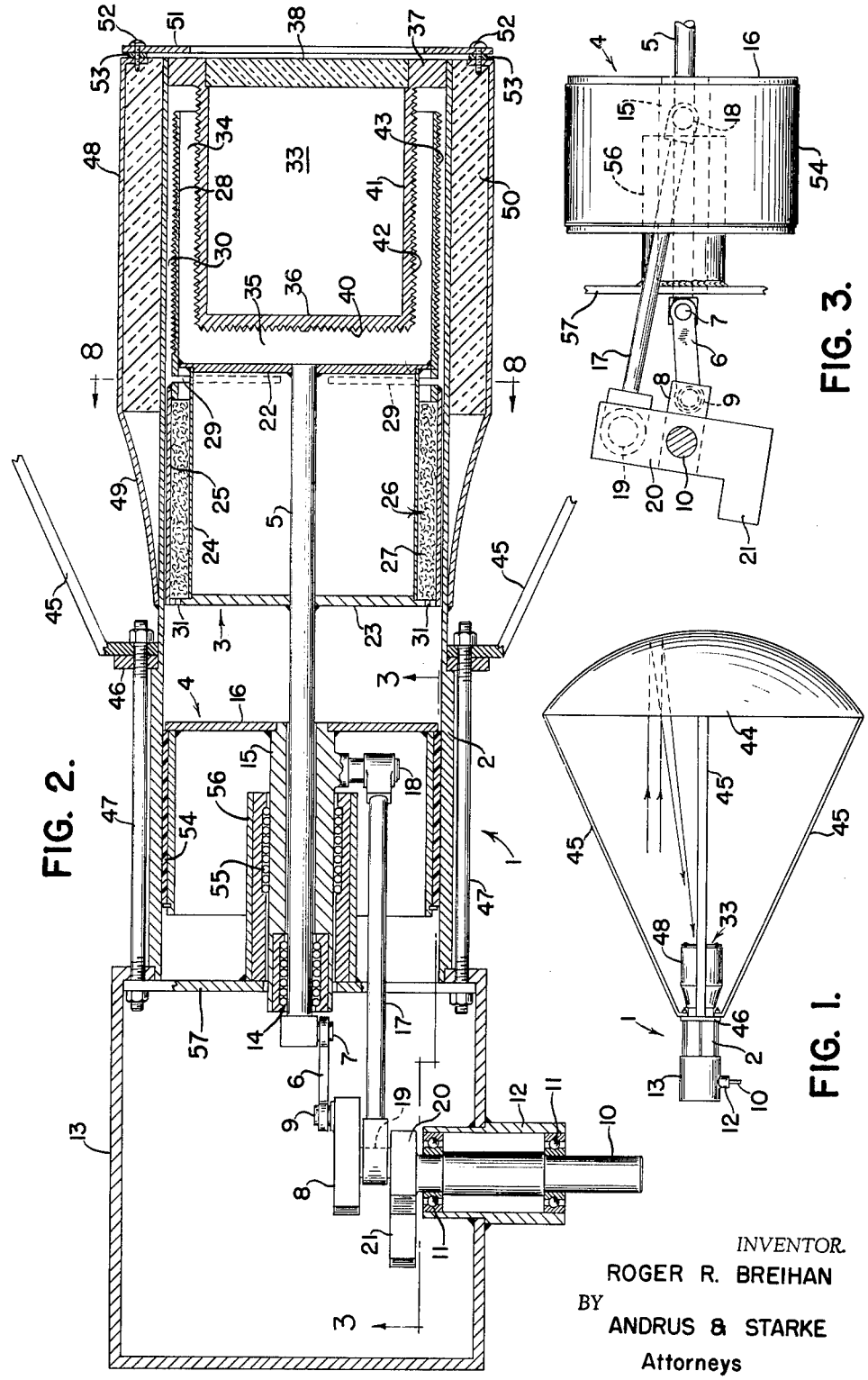
INVENTOR.
ROGER R. BREIHAN
BY ANDRUS & STARKE
Attorneys Dec. 21, 1965   R. R. BREIHAN   3,224,187
HOT GAS ENGINE Filed May 4, 1964   2 Sheets-Sheet 2

INVENTOR.
ROGER R. BREIHAN
BY
ANDRUS & STARKE
Attorneys

United States Patent Office 3,224,187
Patented Dec. 21, 1965

1

3,224,187
HOT GAS ENGINE
Roger R. Breihan, 118 W. Broadway, Monona, Wis.
Filed May 4, 1964, Ser. No. 364,844
10 Claims. (Cl. 60—24)

This invention relates to a hot gas engine and more particularly to an improved closed cycle, hot air engine in which solar energy is used as the power source.

A conventional hot gas engine normally includes a power piston and a displacement piston which are mounted for out-of-phase movement. Air or other gas is heated in a hot chamber by an external source of heat and during the cycle the displacement piston moves up into the hot chamber to displace the hot air through a regeneration chamber to the cold chamber where the air undergoes an isothermal compression. The displacement piston then moves downwardly to meet the power piston which is moving up, and air from the cold chamber is forced back through the regeneration chamber to the hot chamber. The pressure of the air in the hot chamber is greater than atmospheric and the pressure forces both the displacement piston and pressure piston downwardly to provide the power stroke. The displacement piston then returns in an upward stroke while the power piston continues to move downwardly so that hot air from the hot chamber is again displaced through the regeneration chamber to the cold chamber where it is again compressed as the pressure piston begins its upward stroke to repeat the cycle.

The present invention is directed to a hot gas engine having improved efficiency and which uses solar energy as the heat source. According to the invention, a cup-like solar energy receiver is located in an end of the engine and a parabolic mirror is positioned to direct the solar radiation into the solar receiver to heat the same.

The engine includes a power piston and a displacement piston, both of which are connected to an output shaft. The displacement piston is provided with a cylindrical extension which is spaced radially outward of the solar energy receiver and air, in moving from the hot chamber to the cold chamber, passes around the cylindrical extension to thereby provide an increased path of travel and provide a greater degree of heat transfer between the solar energy receiver and the air. In addition, the surfaces of both the solar energy receiver and the cylindrical extension on the displacement piston are provided with grooves or threads which not only increase the surface area for heat transfer, but provide a turbulent air flow which again increases the rate of heat transfer to the air.

While other forms of heat energy can be used, the engine is particularly designed to utilize solar energy and has specific application for use in remote and underdeveloped areas where other sources of energy are not available. In addition, the engine can be used as a stand-by source of power for fallout shelters or military installations in the event regular sources of energy are curtailed or destroyed.

Other objects and advantages will appear in the course of the following description:

The drawings illustrate the best mode presently contemplated of carrying out the invention.

In the drawings:

FIG. 1 is a side elevation of the hot gas engine of the invention with the parabolic mirror attached;

FIG. 2 is a longitudinal section of the engine;

FIG. 3 is a fragmentary view taken along line 3—3 of FIG. 2 and showing the connection of the piston rods to the drive shaft;

Figure 4:
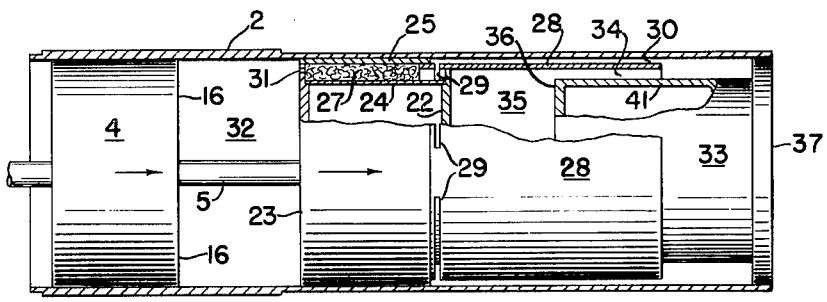
FIG. 4 is a diagrammatic representation of the displacement and power pistons during the cycle in which both pistons are moving in the upstroke.

The drawings illustrate a hot gas engine 1 of the closed cycle type and gases such as air, Freon, hydrogen, or the like, may be used as the working medium. As best shown in FIG. 2, the engine 1 includes a cylindrical shell or casing 2 and a displacement piston 3 and a power piston 4 are mounted for movement within the cylinder 2.

A piston rod 5 is connected to the displacement piston 3, and extends outwardly of the cylinder and is pivotally connected to one end of a link 6 by a pin 7. The opposite end of the link 6 is connected to a link 8 by a pin 9 and the link 8 is secured to an output shaft 10. The output shaft 10 is journalled in a pair of bearings 11 which are mounted in a housing 12, and the housing in turn is welded within an opening in a casing 13 which is secured to the end of the cylinder 2.

The piston rod 5 of displacement piston 3 is journalled for reciprocating movement in a recirculating ball bushing 14 mounted in a recess in the end of sleeve 15 secured to the head 16 of the power piston 4. Ball bushing 14 can be constricted in accordance with Patent 2,452,117 and serves to minimize the friction between rod 5 and the power piston 4.

A piston rod 17 is connected by pin 18 to the sleeve 15, and the outer end of the rod 17 is pivotally connected by pin 19 to an arm 20 which is secured to the output shaft 10. The arm 20 is provided with a suitable counterweight 21.

The connections of the displacement piston 3 and power piston 4 to the output shaft 10 are such that the pistons are out of phase and preferably from 75° to 80° out of phase, with the displacement piston leading. The particular phase relationship between the displacement piston and the power piston depends upon the individual unit and can be generally anywhere in the range of 60° to 120°.

The rotation of output shaft 10 can be used to drive any desired working element. For example, the output shaft 10 can be connected to a pump, fan, an alternator for charging batteries, a flexible shaft drive for grinding, polishing and other mechanical operations, a drive system to operate radar installations, and various other applications.

The displacement piston 3 includes a forward head 22 and a rear head 23 which are connected by an inner cylindrical wall 24 and an outer cylindrical shell 25. The shell 25 is spaced outwardly from the wall 24 to provide a regeneration chamber 26 therebetween.

The regeneration chamber contains a material 27 having a large surface area, a high specific heat and a relatively low coefficient of thermal conductivity. During the cycle, air is displaced through the regeneration chamber where heat is transferred between the air and the material 27. It has been found that finely divided particles or fibers of stainless steel, such as shavings or wool, is very satifactory as the regeneration material 27.

Figure 8:
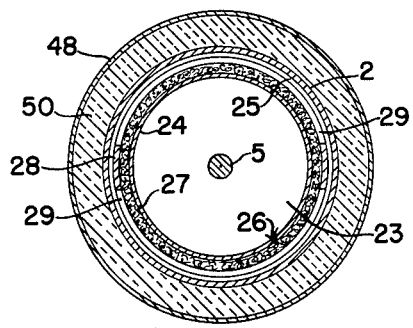
FIG. 8 is a sectional view taken along lines 8—8 of FIG. 2.

A cylindrical extension 28 or sleeve is welded to the outer periphery of the forward head 22 of displacement piston 3 and to shell 25. The cylindrical extension 28 is provided with a pair of slots 29 each of which extends a substantial distance around the periphery of the extension. As best shown in FIG. 8, each slot 29 extends approximately 160° and the slots provide communication between the annular space 30 and the regeneration chamber 26. In addition, the slots 29 provide an air gap which minimizes metal-to-metal heat conduction from the hot end to the cold end of the engine. The rear wall 23 of the displacer piston is provided with a series of holes 31 which connect the regeneration chamber 26 and the cold chamber 32.

While the drawings show the regeneration chamber 26 as being formed in the displacement piston 3 it is contemplated that the regeneration chamber 26 may be separate from the displacement piston and may also be located outside of the cylinder 2.

The air or the gas is heated by means of the cup-like solar energy receiver 33 which is located in the end of cylinder 2 and is spaced radially inward of the cylindrical extension 28 to provide an annular space 34 between the members. The space 35 between the forward head 22 of the displacement piston 3 and the end 36 of the cup-like receiver 33 is the hot chamber where primary heating of the gas occurs.

The terms "hot chamber" and "cold chamber" as used in the description mean chambers whose size during the cycle varies from nil to a finite value and which contain a hot and a cold portion of the gas.

Solar energy receiver 33 is provided with an outwardly extending flange 37 which is secured within the end of cylinder 2, and a lens 38 is located within the open end of the receiver. The sunlight or solar radiation passes through the lens 38 and into contact with the inner surface of receiver 33 to thereby heat the receiver and heat is transferred to the air within the hot chamber 35 and air within the annular passage 34. The lens may be quartz, glass or plastic and not only serves to prevent foreign material from accumulating within the receiver 33 but also prevents long wave radiation from passing out or escaping from the receiver and thereby serves to increase the temperature of the receiver. The cup or receiver 33 can be evacuated, if desired, which will tend to increase the heating of the inner surface of the cup.

To increase the heat transfer between the cup 33 and the air within the chamber 35 and passage 34, the outer surface of the end wall 36 of the cup 33 is provided with a series of concentric grooves 40. In addition, the outer surface of the cylindrical side wall 41 of the cup 33 is provided with a spiral thread indicated by 42. The thread 42 not only increases the surface area for heat transfer but also provides a turbulent flow of air within the passage 34 which greatly improves the rate of heat transfer between the metal cup 33 and the air flowing within the passage.

Similarly, the outer surface of extension 28 is provided with threads or grooves 43 which also creates a turbulent flow of the air in passage 30 and increases the heat transfer.

A parabolic mirror 44 is mounted on braces 45 connected to the engine 1, and serves to direct the sunlight into the receiver 33. As best shown in FIG. 2, the inner ends of the braces 45 are attached to a ring 46 which bears against an external shoulder in cylinder 2. The ring 46 is connected to an inwardly extending flange on casing 13 by tie rods 47.

A cylindrical casing 48 is spaced outwardly of the cylinder 2 and the inner end of the casing 48 tapers inwardly, as indicated by 49, and is connected to the cylinder 2 at a location adjacent the cold chamber 32. The ring 46, braces 45 and casing section 49 are all in direct heat conductive relation with the cylinder 2 in the vicinity of the cold chamber 32 and thus serve as fins to cool this area of the cylinder and reduce the temperature of the air in the cold chamber.

To reduce the heat loss from the hot end of the engine to the atmosphere, a layer of insulation 50 is located between the outer casing 48 and the cylinder 2, but no insulation is located within the section 49 of the casing.

As the section 49 is in direct heat conductive relation with cylinder 2, heat is transferred through section 49 to casing 48. This decreases the temperature gradient between cylinder 2 and casing 48 and thereby reduces the heat loss to the atmosphere.

To prevent the solar radiation from directly contacting the layer of insulation 50, a protective stainless steel disc 51 is disposed in spaced relation to the end of the engine, outwardly of the layer of insulation. The disc 51 is secured to a flange of casing 48 by screws 52, and insulating spacers 53 serve to space the disc 51 from the end surface of the cup to prevent metal-to-metal contact between the members.

To increase the thermal conductivity of the cup-like receiver 33, the receiver is preferably formed of copper with nickel plated internal and external surfaces. The nickel coating serves to prevent oxidation of the heat transfer surfaces.

To eliminate the need for external lubricants, the power piston 4 can be provided with an outer sleeve 54 formed of a solid lubricating material such as polytetrafluoroethylene (Teflon) or a silicone which is an organosilicon oxide polymer having the structural unit —$R_2Si$—O— where R is a monovalent organic radical. In addition, the sleeve 15 of power piston 4 is journalled within a recirculating ball bushing 55, similar in structure to ball bushing 14, which is mounted in ring 56 carried by the plate 57. The plate 57 is secured to the casing 13 by the tie rods 47. The ball bushing 55 acts to convert the sliding friction between power piston 4 and shell 2 to rolling friction and thereby aids in increasing the overall efficiency of the engine.

The engine is a closed cycle type and in operation, solar radiation is focused by the parabolic mirror 44 through the lens 38 to heat the inner surface of the cup 33. By rotating the output shaft 10 manually the engine will start and will continue to operate as long as the cup is heated by solar energy. FIGS. 4–7 illustrate the cycle of the engine. In FIG. 4, both the power piston 4 and the displacement piston 3 are moving in the upstroke (to the right in FIG. 4), and the hot gas or air within the hot chamber 35 is forced through the passage 34 around the extension 28, through passage 30, through slot 29 and through the regeneration chamber 26 to the cold chamber 32. As the average enclosed pressure in chambers 32 and 35 is less than atmospheric, the atmospheric pressure works against power piston 4 during the upstroke to the position shown in FIG. 5. When the displacement piston reaches the position shown in FIG. 5, the forward head 22 of the displacement piston 3 is in proximate relation to the end wall 36 of the cup 33 so that virtually all the gas within the hot chamber 35 will have displaced to the cold chamber 32. As the gas passes from the hot chamber 35 through passage 34, its temperature is increased due to heat transfer from the cup 33. As the gas flows through the regeneration chamber 26 to the cold chamber 32, the gas gives up heat to the stainless steel wool 27 and upon entering the cold chamber it undergoes an isothermal compression due to the upward movement of the power piston 4.

Figure 5:
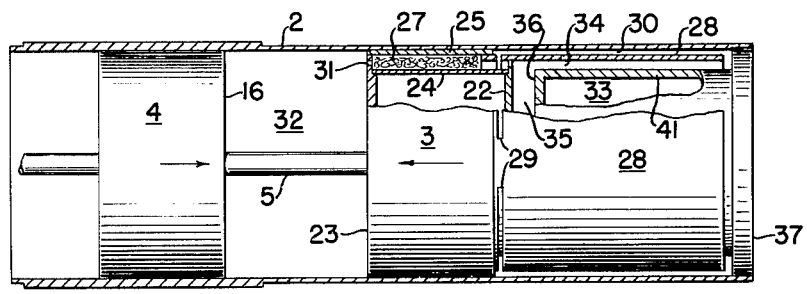
FIG. 5 is a view similar to FIG. 4 showing the displacement piston moving in the downstroke and the power piston moving in the upstroke.

As shown in FIG. 5, the power piston is still moving in its upstroke and the displacement piston 3 begins its downward stroke thereby forcing the gas from the cold chamber 32 through the regeneration chamber 26 into the passage 30, around the extension 28 and back to the hot chamber 35. The gas passing through the regeneration chamber picks up heat from the stainless steel wool 27.

Figure 6:
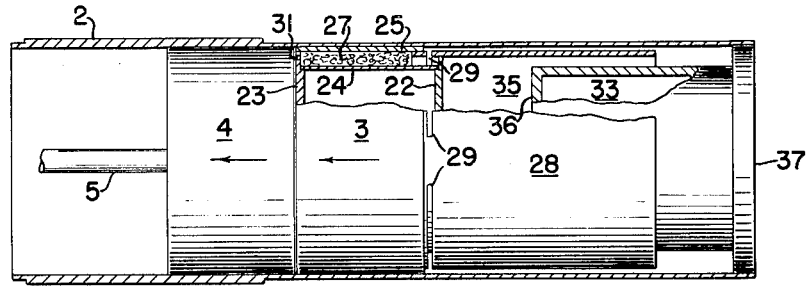
FIG. 6 is a view similar to FIG. 4 showing both pistons moving in the downstroke.

When the pistons reach the position shown in FIG. 6, they are in substantially contacting relation, and as the gas pressure within the hot chamber 35 is greater than atmospheric, the pressure of the gas in the hot chamber thereby moves both the displacement piston 3 and power piston 4 downwardly to provide the power stroke. The gas undergoes an isothermic compression during the portion of the cycle starting with the stroke at FIG. 5 to the end of the stroke of FIG. 6.

Figure 7:
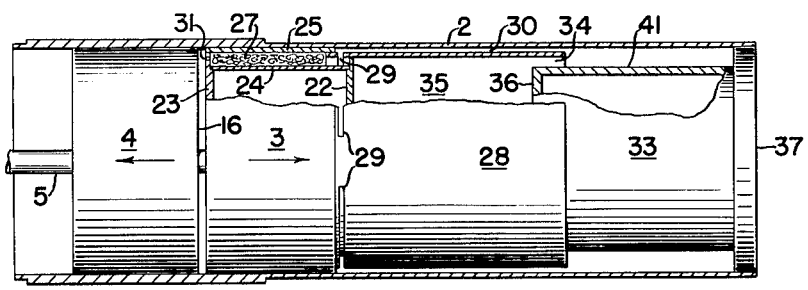
FIG. 7 is a view similar to FIG. 4 showing the power piston still moving in the downstroke and the displacement piston starting the upstroke.

When the pistons reach the position shown in FIG. 7, the power piston 4 continues its downward stroke while the displacement piston 3 starts moving upwardly back to the original position shown in FIG. 4. As the displacement piston moves upwardly, the hot gas within the hot chamber 35 again is forced around the extension 28 of the displacement piston through the regeneration chamber 26 and into the cold chamber 32. No compression of the gas in the cold chamber occurs until the power piston 4 begins its upward stroke, as in FIG. 4, and then the cycle is repeated.

While any type of heating source can be used with the engine of the invention, it is particularly designed for use with solar energy. The parabolic mirror directs the solar rays into the cup 33 to heat the cup and the heat is transferred to the gas in the hot chamber. The braces 45 which support the mirror serve as cooling fins which help reduce the temperature of the cold chamber 32.

The cylindrical extension or sleeve 28 provides an increased path of travel for the gas moving between the hot chamber 35 and the cold chamber 32 and thereby substantially increasing the rate of heat transfer from the solar energy receiver 33 to the gas. This, of course, materially increased the efficiency of the engine.

The rate of heat transfer is further increased by providing the threads 42 and the grooves 40 in the outer surface of the cup-like receiver 33. The threads 42 in particular not only increase the surface area but provide a turbulent flow for the air flowing within the passage 34 which results in a greater rate of heat transfer to the gas or air.

The engine is particularly adapted for use in remote or isolated areas where other forms of power are not available. The engine also has use for military installations and as such, radioactive pellets may be substituted for solar energy as the heating source. In this case, a radio-opaque casing 48 or other shield should be used.

The engine is also thermodynamic reversible. If the output shaft 10 is driven with auxiliary power and if the displacement piston 3 is leading the power piston in phase, the hot end will be cooled to provide a refrigerating effect.

It is not necessary that sleeve 28 be connected to displacement piston 3. The sleeve 28 can be a stationary member, spaced from both cylinder 2 and cup 33. In this case, the piston 3 would slide within the sleeve 28 and the annular passage 30 would communicate through a separate regeneration chamber to the cold chamber 32.

Various modes of carrying out the invention are contemplated as being within the scope of the following claims particularly pointing out and distinctly claiming the subject matter which is regarded as the invention.

I claim:

1. In a hot gas engine, a cylinder, a solar energy receiver located within the forward end of the cylinder, a power piston located in the rear end of the cylinder, a displacement piston located in the cylinder between the receiver and the power piston with the space between the displacement piston and the power piston defining a cold chamber and the space between the displacement piston and the receiver defining a hot chamber, said receiver having an opening to receive solar radiation and having a wall to be heated by said solar radiation and disposed in heat conductive relation with the gas in the hot chamber, a mirror positioned to direct solar radiation into the opening of the receiver, and support means interconnecting the mirror and the cylinder, said support means being attached to the cylinder at the location of the cold chamber and said support means serving to support the mirror and also serving to conduct heat from the cylinder at the area of the cold chamber.

2. The structure of claim 1 and including a transparent lens enclosing the opening in said receiver.

3. The structure of claim 1 in which the support means consist of a series of metal braces which are connected in heat conductive relation with the cylinder at the area of the cold chamber.

4. In a hot gas engine, a cylinder, a solar energy receiver located within the forward end of the cylinder, a power piston located in the rear end of the cylinder, a displacement piston located in the cylinder between the receiver and the power piston with the space between the displacement piston and the power piston defining a cold chamber and the space between the displacement piston and the receiver defining a hot chamber, said receiver having an opening to receive solar radiation and having a wall to be heated by said solar radiation and disposed in heat conductive relation with the gas in the hot chamber, a mirror positioned to direct solar radiation into the opening of the receiver, support means interconnecting the mirror and the cylinder, said support means being attached to the cylinder at the location of the cold chamber, a layer of insulating material surrounding the cylinder at the area of the hot chamber, and a metallic shell disposed outwardly of the insulating material and connected directly with the cylinder at the area of the cold chamber, the connections of the support means and the metallic shell with the cylinder serving to conduct heat from said area of the cold chamber and reduce the temperature gradient across the insulating material.

5. In a hot gas engine, a cylinder, a displacement piston slidable within the cylinder, a cup-like solar energy receiver located within the cylinder, said receiver having a generally cylindrical side wall and an open end facing the end of the cylinder and having an end wall facing the displacement piston, the space between the end wall of the receiver and the displacement piston defining a hot chamber, means for directing solar energy in through the open end of the receiver to heat the receiver with the heat being transferred to the gas within the hot chamber, a generally cylindrical baffle extending longitudinally outward from the displacement piston in spaced relation to the side wall of the reeciver to provide a first annular passageway, said baffle being spaced radially inward of the cylinder to provide a second annular passageway communicating with the first annular passageway at the outer end of the cylinder, the inner end of said cylindrical baffle extending inwardly beyond the outer end of the displacement piston, said displacement piston having a longitudinally extending passage defining a regeneration chamber, and the portion of said baffle extending inwardly beyond the outer end of said piston having at least one circumferentially extending opening, said opening providing communication between the second annular passageway and the regeneration chamber and decreasing the metal-to-metal conduction through the engine.

6. The structure of claim 5, in which the opening is a slot extending a substantial distance around the periphery of the baffle.

7. In a hot gas engine, a cylinder, a displacement piston slidable within the cylinder, a cup-like solar energy receiver mounted within the cylinder, said receiver having a generally cylindrical side wall, an open end facing the end of the cylinder and having an end wall facing the displacement piston, the space between the end wall of the receiver and the displacement piston providing a hot chamber, means for directing solar energy through the open end of the receiver to heat the receiver with the heat being transferred to the gas within the hot chamber, a generally cylindrical baffle extending longitudinally outward from the displacement piston in spaced relation to the side wall of the receiver to provide a first annular passageway, said baffle being spaced radially inward of the cylinder to provide the second annular passageway communicating with the first annular passageway at the outer end of the cylinder, a regeneration chamber located within the displacement piston, and conduit means for providing communication between the second annular passageway and the regeneration chamber with gas being heated in the hot chamber and passing through said first annular passageway and around the outer end of said baffle and back through the second annular passageway and through said conduit means to the regeneration chamber.

8. The structure of claim 7, in which the metal members are stainless steel wool.

9. The structure of claim 7 in which the regeneration chamber is annular in shape and is disposed adjacent the periphery of the displacement piston.

10. In a hot gas engine, a cylinder, a displacement piston slidable within the cylinder, a power piston slidably disposed within the cylinder with the space between the power piston and displacement piston defining a cold chamber, heating means located on the opposite side of the displacement piston from the power piston with the space between the displacement piston and the heating means defining a hot chamber, a piston rod connected to the displacement piston and extending through an opening in the power piston and connected to an object to be driven, a second piston rod connected to the power piston and connected to an object to be driven, a recirculating ball bushing connected to the power piston and journalling the piston rod of the displacement piston for axial movement relative to the power piston, a second recirculating ball bushing mounted on the cylinder, and a tubular member journalled for axial movement within the second bushing and disposed concentrically around the piston rod of the displacement piston and secured to said power piston to thereby journal the power piston for axial movement.

References Cited by the Examiner
UNITED STATES PATENTS

| | | | |
|---|---|---|---|
| 537,517 | 4/1895 | Anderson | 60—24 |
| 646,406 | 4/1900 | Anderson et al. | 60—24 |
| 1,277,849 | 9/1918 | Campbell et al. | 60—24 |
| 1,675,829 | 7/1928 | Smith | 60—24 X |
| 2,452,117 | 10/1948 | Ferger | 308—6 |
| 2,567,637 | 9/1951 | De Brey et al. | 60—24 |
| 3,029,596 | 4/1962 | Hanold et al. | 60—24 |
| 3,118,285 | 1/1964 | Malaker et al. | 60—24 X |

SAMUEL LEVINE, *Primary Examiner.*

EDGAR W. GEOGHEGAN, JULIUS E. WEST,
*Examiners.*